H. W. AXFORD.
INCUBATOR.
APPLICATION FILED AUG. 26, 1912.
1,062,687.
Patented May 27, 1913.
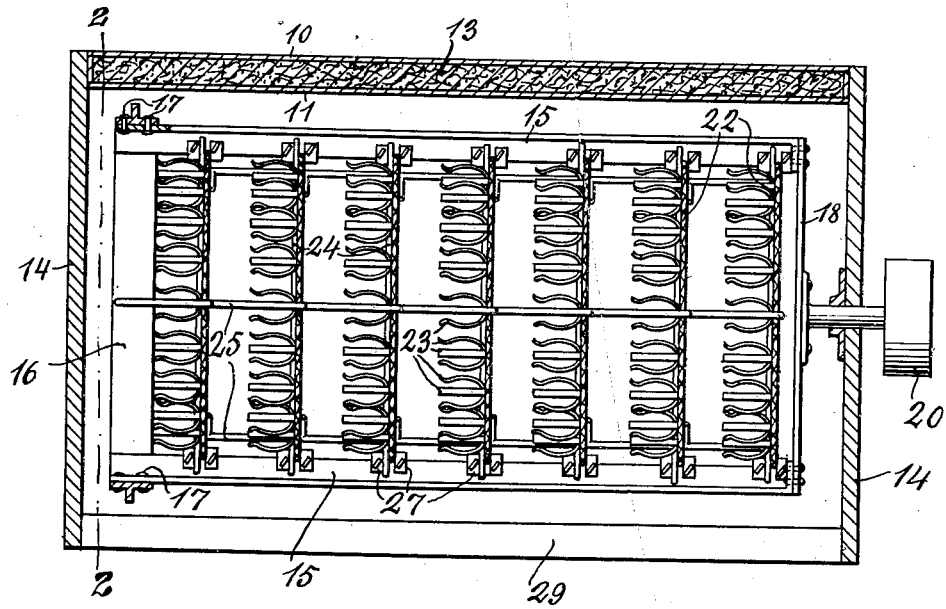
Fig. 1.
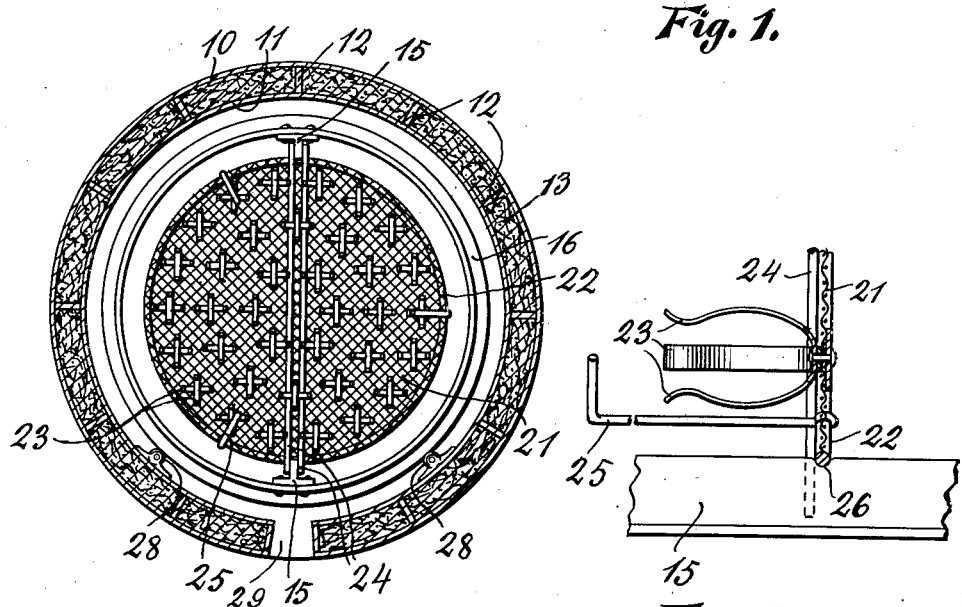
Fig. 2.
Fig. 3.
Witnesses
E. Larson
M. Schmidt
Inventor
Harris W. Axford.
By Eugene ——
Attorney

UNITED STATES PATENT OFFICE.

HARRIS W. AXFORD, OF CHICAGO, ILLINOIS.

INCUBATOR.

1,062,687.  Specification of Letters Patent.  Patented May 27, 1913.

Application filed August 26, 1912. Serial No. 717,079.

*To all whom it may concern:*

Be it known that I, HARRIS W. AXFORD, a citizen of the United States, residing at Chicago, in the county of Cook and State of Illinois, have invented certain new and useful Improvements in Incubators, of which the following is a specification.

This invention has for its object to provide in an incubator a novel form of egg-holder which holds the eggs properly spaced apart and in horizontal position, and also allows a free circulation of air therebetween. Means are also provided for rotating the holder so that all the eggs may be turned over simultaneously, thus doing away with the trouble and work of turning each egg by hand.

The invention also has for its object to provide a holder which supports a large number of eggs, whereby the capacity of the incubator is increased without increasing its size.

Other objects and advantages of the invention will be pointed out in the detailed description appearing hereinafter, and in order that the invention may be better understood, reference is had to the accompanying drawing in which—

Figure 1 is a central longitudinal section of the incubator showing the egg-holding devices. Fig. 2 is a longitudinal section on the line 2—2 of Fig. 1. Fig. 3 is a detail showing one of the egg holding clasps.

Referring specifically to the drawing, the casing of the incubator is cylindrical and has a double wall composed of concentric sheet metal cylinders 10 and 11, respectively. The cylinders are suitably spaced apart and between the same are longitudinal partitions 12 which divide the space between the cylinders into a plurality of compartments, which latter contain a suitable heat-insulating material 13. The ends of the casing are closed by heads 14 one of which is removable so that access to the interior may be had.
Within the herein described casing is mounted a rotatable egg-holder which is constructed and arranged as follows: Two parallel diametrically opposite T-bars 15 are secured at one end to a hoop 16 located concentrically in the casing and spaced from the inner walls thereof. The webs of the bars 15 point inward and the hoop is secured to the flanges thereof by rivets 17 or other suitable means. The bars 15 are connected at their other ends by a cross bar 18 to which latter, at the middle thereof, is secured a stub-shaft which passes through an opening in the adjacent head 14, and has on the outside thereof a pulley 20. The other head 14 is removable. This structure forms an open frame within which are held the egg-supporting trays which will now be described.

Each egg-supporting tray comprises a cylindrical sheet 21 of foraminous material such as wire screen-cloth, said sheet being secured at its edge to a wire ring 22. On one side of the sheet 21 is secured a plurality of horizontal egg-holding clasps which are composed of four spring fingers 23 curved to conform to the configuration of an egg, the latter being placed between the fingers and securely held in place thereby. The fingers are secured at one end to the sheet 21, and their free ends are curved outward so as to facilitate the insertion of the egg therebetween.

Secured to the sheet 21 and extending across the same diametrically, are two stout wires 24 which are parallel and spaced apart sufficiently so that their ends, which project from the sheet, may straddle the webs of the bars 15.

A plurality of egg supporting trays is mounted vertically between the bars 15, said trays being spaced apart a sufficient distance so that the eggs will not be broken by coming in contact with the adjacent tray. The trays are held spaced apart by outstanding arms 25 secured to the ring 22. In the edge of the web of the bars 15 are also made notches 26 in which the edges of the trays seat. Further means for stationing the trays may be provided by mounting small thumb-screw clamps 27 on the webs of the bars 15 in front and behind each tray.

The casing is placed horizontally, and the fingers 23 hold the eggs so that their longitudinal axes are horizontal. The frame which supports the trays is rotatable on a horizontal axis. It will therefore be evident that the eggs are revolved horizontally upon rotating the frame, which is done from a suitable source of power by means of a belt to the pulley 20.

The hoop 16 is located outside the bars 15 and is T-shaped in cross-section, its flange being presented outward so as to engage rollers 28 on the inside of the casing wall 11, said rollers therefore serving to support the forward end of the rotatable frame.

By the structure herein described a large number of eggs may be placed in the incubator, and the eggs are supported so that there is no danger of breakage. The trays 21 allow a free circulation of air around the eggs.

In the bottom of the casing is a slot 29 to allow heat from the heating medium to enter the casing.

I claim:

1. An egg holder for incubators comprising an open frame, vertical supports mounted in said frame, said supports being spaced from each other laterally and made of foraminous material, and egg-holding clasps extending horizontally from the side of the supports.

2. An egg holder comprising diametrically opposite bars, means for holding said bars in spaced and parallel relation, laterally spaced vertical supports mounted between the bars, said supports being made of foraminous material, and egg-holding clasps extending horizontally from the side of the supports.

3. An egg holder comprising diametrically opposite T-bars the webs of which point inward and are provided with notches, means for connecting said bars in spaced and parallel relation, vertical supports mounted between the bars on the webs thereof and seating in the notches in said webs, whereby said supports are held spaced from each other, and egg-holding clasps extending horizontally from the side of the supports.

4. An egg holder comprising diametrically opposite T-bars having their webs pointing inward, means for connecting said bars in spaced and parallel relation, vertical supports mounted between the bars, spaced transverse members secured to one side of the supports and projecting from the edge thereof, the projecting portions of said members straddling the webs of the T-bars, and egg-holding clasps extending horizontally from the side of the supports.

5. An egg holder comprising diametrically opposite bars, means for connecting said bars in spaced and parallel relation, vertical supports mounted between the bars, arms extending from one side of the supports and engageable with adjacent supports for holding the supports in laterally spaced relation, and egg clasps extending horizontally from the side of the supports.

In testimony whereof I affix my signature in presence of two witnesses.

HARRIS W. AXFORD.

Witnesses:
S. J. LEHRER,
H. G. BATCHELOR.